Nov. 6, 1934. J. L. TAYLOR 1,979,652
DRILLING CHUCK
Original Filed Aug. 22, 1932
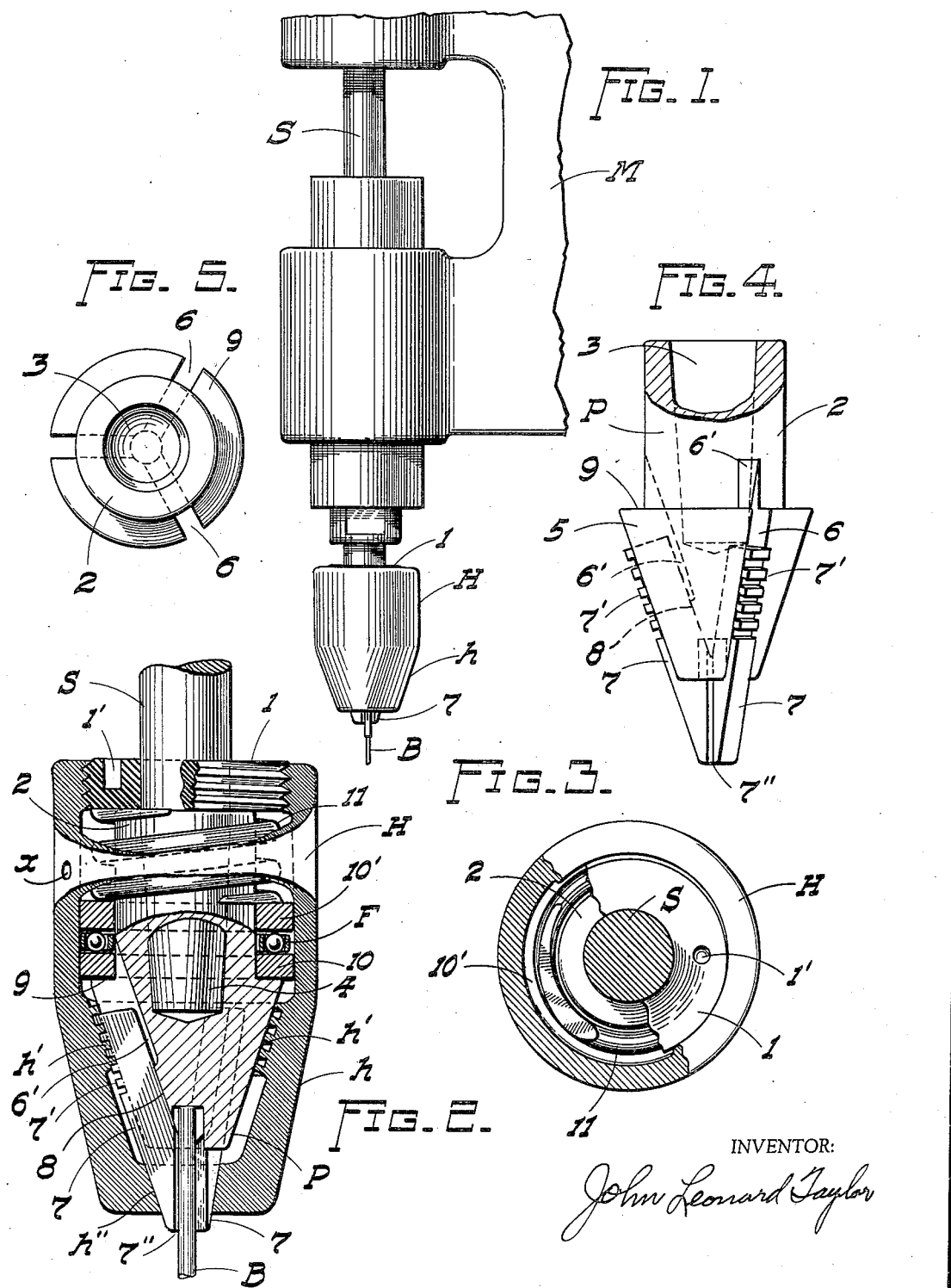
INVENTOR:
John Leonard Taylor Patented Nov. 6, 1934

1,979,652

UNITED STATES PATENT OFFICE 1,979,652

DRILLING CHUCK

John Leonard Taylor, Milwaukee, Wis.

Application August 22, 1932, Serial No. 629,847
Renewed March 12, 1934

18 Claims. (Cl. 279—61)

This invention relates to bit-centering chucks employed in drilling tools or machines requiring drill-bits or similarly clamped tools.

The objects of the invention are:—

The improving of the construction and operation of devices of this class generally.

The providing of chucks which will accurately center extremely small tools.

The providing of features of construction of such chucks which will permit such operation.

The providing of a chuck jaw construction in which rocking or oscillation is positively prevented.

The providing of such construction characterized by spaced bearings on one side of a chuck jaw, and a single bearing on the other side of said jaw acting in a direction opposite to said spaced bearings and at a point opposite the space between said bearings.

The providing of such a construction including resilient means for applying an initial load to the parts.

The providing of resilient means for initially positioning the parts of such a device to eliminate looseness due to necessary running clearances between the parts.

The providing of a chuck structure in which a guiding function is incorporated in threads primarily furnished for actuating chuck elements.

Other objects and advantages will be apparent from the descriptive text, the novel aspects of the structure being pointed out in the appended claims, both portions of this application referring to the accompanying drawing, illustrating the invention.

Similar reference characters have been applied to the same parts throughout the specification and in the several views of the accompanying drawing in which:

Fig. 1 is a side elevation of a portion of a machine showing an application of the invention here concerned.

Fig. 2 is a vertical sectional elevation of the invention.

Fig. 3 is a plan view of Fig. 2 partially in section.

Fig. 4 is a view, partially in section, of a conical plug element employed in this invention, showing clamping elements in the position they occupy in Fig. 2.

Fig. 5 is a top plan of Fig. 4, with the clamping elements removed.

The scale of the several views, other than Fig. 1, is enlarged noticeably with respect to the field of operations intended; the drill bits here employed are for work of exceptional precision in the art of producing apertures of minute diameter.

Referring to the drawing, H represents an appropriate housing or shell inclosing the concerned mechanism to form an assembly carried by a spindle-shaft S; the said shaft will be a part of another assembly M wherewith is associated spindle-actuating means patentably outside the scope of the development here considered. The aforesaid housing is closed at the top by a washer-like disc 1 threaded to be adjustable in said housing. The aforesaid disc functions to aid as a housing centering means that coacts with a plug or core P. The said plug forms a structurally integral terminal for the said shaft. The shank 2 of said plug has a tapered bore 3 which receives the correspondingly tapered end 4 of the spindle shaft. The connection so formed is fixed, rigid, but, nevertheless, removable. The end of the plug provides a conical enlargement 5 wherein is cut ways or grooves 6 accommodating slidable clamping jaws 7. The said jaws are disposed around the conical surface at convenient intervals, but are shown for convenience in the present disclosure as 120° apart. The several grooves are relieved at 6' to leave the said jaws contacting in said grooves on a bearing surface 8 purposely located for providing a 3-point bearing arrangement affecting each of the three clamping jaws in their relationship intermediate a conical portion $h$ of the housing H and the aforesaid coned terminus 5 of the plug P. Means are provided so that rotation of the housing H will compel the clamping jaws to move, in perfect unison, up or down, to loosen and release, or converge and clamp, a drill-bit B. To attain this precise and united action in the jaws, the conical part $h$ of the housing H has internal threads, of suitable design $h'$; which register with similar threads 7' fashioned upon the peripheral edges of the aforesaid jaws. The jaws 7 project beyond the housing and find a bearing for their outer faces at a conical aperture $h''$ formed in the base of said housing. The said jaws are beveled to offer vertical ridges 7'', that parallel the chuck's vertical axis, between which is gripped the shank of the aforesaid drill-bit. Between the periphery of the aforesaid aperture $h''$ and the threaded area $h'$, the interior of the housing is relieved to clear the clamping jaws; the surfaces 8 are arranged to lie opposite this clearance so that the 3-point bearing for the jaws 7 will be at $h'$, $h''$, and 8. In this way all tendency towards rocking in said jaws is eliminated, while friction due to sliding is minimized, and guidance of the jaws is established whereby vertical and axial parallelism is assured at the ridges 7″, for any size of bit chosen, the variation in size being, in the present instance, limited to slight diameter differences in drill-shanks.

The threaded relation between jaws and shell, and the sliding leeway allowed the clamping jaws, necessitates a certain amount of freedom, or looseness of fit, such being essential to the adjusting of the chuck manually and easily. This play must be taken up uniformly around the chuck's axis when the clamping condition obtains. The slight play necessary, if not positively cared for will cause difficulty in work of this kind, where the holes desired will be three thousandths of an inch and less in diameter. There is also the consideration of wear which noticeably increases the looseness in time. With this play taken care of the desired accuracy is attained. For gaining these results, the plug P, reduced in diameter to provide the shank 2, offers an annular shoulder 9 upon which rests the lower raceway 10 of an anti-friction bearing F. The upper raceway 10′ is resiliently depressed by a spring 11 which shoulders under the disc 1; the tension of said spring being predetermined, and, through the positioning of the said disc, whose upper face has suitable spanner-wrench holes 1′ for this purpose, the parts being allowed only such clearance as will result in a correct running fit therebetween. The anti-friction bearing F eliminates such resistance to turning by hand as would obviously obtain were this adjunct absent when clamping or releasing a bit. Further, the said bearing uniformly distributes the spring's pressure around the aforesaid chuck axis, so that the contacting points h′, h″ and 8 aforesaid are positively held together as is the intention. This uniformly annular pressure, which acts between the shoulder disc 1 and the shoulder 9, insures that the said disc, like the fixedly set shoulder aforesaid, be absolutely normal to the spindle-shaft axis. This relation being maintained, by the spring pressure, against possible change under any exigency probable in the class of work handled, obviates all gyratory tendency at the drill-bit's boring point.

The chuck can be suitably lubricated through the aperture X provided for this purpose.

Having described the invention what I claim and desire to protect by United States Letters Patent, is:—

1. A drilling chuck having, an interiorly threaded housing shell inclosing a spindle center element, converging jaw members, grooves formed in said element coincident to the width of each jaw, a conical aperture in said housing coincident to the circle of the assembled jaws, said aperture spaced from the threaded portion of said housing, and said housing being relieved between said aperture and said threaded portion and free of the aforesaid jaws, said grooves being formed to leave said jaws contacting said element at a limited area opposite the space between the aforesaid threaded portion and the said aperture, and threads on said jaws cooperating with the threads in said shell and constituting guides and driving means for said jaw members.

2. In a chuck the combination of a core, a plurality of jaws and a housing, a plurality of spaced bearing surfaces in said housing, and a plurality of single bearing surfaces on said core, said jaws being disposed between said core and housing in mutually converging relation and inwardly urged at spaced points by the bearing surfaces on said housing, each of said jaws contacting a bearing surface on said core at a point opposite the space between the bearing surfaces on said housing, means yieldably urging the housing bearings toward the core bearings and operative to prevent even the slightest axial oscillatory movement of said jaws, shank engaging surfaces on said jaws and means operative to provide lengthwise converging movement of said jaws.

3. In a chuck the combination of a core element, a plurality of jaws and a housing element, one of said elements having spaced bearing surfaces positioned to engage said jaws and the other element having a bearing surface positioned to engage a jaw opposite the space between said spaced bearing surfaces, shank engaging portions on said jaws, and means operative to move said jaws lengthwise to engage said portions with a shank.

4. In a chuck the combination of a core, a plurality of jaws and a housing, said housing having spaced bearing surfaces therein positioned to engage said jaws, and said core having a bearing surface positioned to engage a jaw opposite the space between said spaced bearing surfaces together with shank engaging portions on said jaws positioned at least in part opposite said space whereby said jaws will take up between a pair of spaced external points and a single internal point effective between said external points to give positive alignment of said jaws.

5. In a chuck the combination of a core, a plurality of jaws and a housing, said housing having spaced bearing surfaces therein and said core having a plurality of bearing surfaces thereon, said jaws being positioned between said core and housing in mutually converging relation and inwardly urged at spaced points by the bearing surfaces on said housing, said jaws each contacting a bearing surface on said core at a point opposite the space between the bearing surfaces on said housing, shank engaging portions on said jaws disposed inwardly of said spaced bearing surfaces and in position to receive from a shank clamped between said portions, a reaction on a line which, extended, passes through the space between said spaced bearings, said portions forming in effect a continuation of the surfaces of said jaws bearing against the core bearings.

6. A chuck as claimed in claim 5 having means resiliently urging said spaced bearings in a direction to continuously force said jaws inwardly against the bearings on said core whereby when said portions take up against a shank, there will be merely an increase in the load on said spaced bearings and no shifting of the load outside the region defined by said spaced bearings, and no tendency toward longitudinal oscillation and misalignment of said jaws.

7. In a chuck the combination of a core element, a plurality of jaws disposed about said core element in mutually converging relation, and a housing element enclosing said jaws and core, one of said elements having longitudinally spaced bearing portions engaging said jaws and the other having a bearing portion engaging each jaw at a point opposite the space between said spaced bearing portions, and means for causing lengthwise movement of said jaws.

8. In a chuck the combination of a core element, a plurality of jaws disposed in circumferentially spaced relation about said core element, and a housing element enclosing said jaws and core, one of said elements having longitudinally spaced bearing portions, engaging said jaws, and the other having a bearing portion engaging each jaw at a point opposite the space between said spaced bearing portions, and means operative to cause mutually approaching movement of said jaws.

9. In a chuck the combination of a core element, a plurality of jaws disposed in circumferentially spaced mutually converging relation about said core element, and a housing element enclosing said jaws and core, one of said elements having longitudinally spaced bearing portions engaging said jaws, and the other having a bearing portion engaging each jaw at a point opposite the space between said spaced bearing portions, shank engaging portions on said jaws and so disposed as to avoid any tendency to longitudinal oscillation of said jaws when taking up against a shank.

10. In a chuck construction a plurality of chuck jaws and means for supporting said jaws in operative relation to each other including members having spaced supporting portions acting on one side of each jaw, and a single supporting portion acting on the opposite side of said jaw substantially opposite the space between said spaced supporting portions, one of said supporting portions constituting threads engaged with said jaws and operative to advance said jaws into engagement with a tool to be held by said chuck.

11. In a chuck construction a plurality of chuck jaws and means for supporting said jaws in operative relation to each other including members having spaced supporting portions acting on one side of each jaw, and a single supporting portion acting on the opposite side of said jaw substantially opposite the space between said spaced supporting portions, one of said spaced supporting portions constituting threads engaged with said jaws and operative to advance said jaws into engagement with a tool to be held by said chuck.

12. In a chuck construction a plurality of chuck jaws and means for supporting said jaws in operative relation to each other including members having spaced supporting portions acting on one side of each jaw, and a single supporting portion acting on the opposite side of said jaw, substantially opposite the space between said spaced supporting portions, and means for moving said jaws including threads on one of said members engaged with said jaws and formed to constitute one of said supporting portions.

13. In a chuck the combination of a core, a plurality of jaws and a housing, a plurality of spaced bearing surfaces in said housing, and a plurality of single bearing surfaces on said core, said jaws being disposed between said core and housing in mutually converging relation and inwardly urged at spaced points by the bearing surfaces on said housing, each of said jaws contacting a bearing surface on said core at a point opposite the space between the bearing surfaces on said housing, and means operative to provide lengthwise converging movement of said jaws including threads formed on one of said bearing surfaces and constituting driving and guiding means for said jaws.

14. In a chuck the combination of a core, a plurality of jaws and a housing, a plurality of spaced bearing surfaces in said housing, one of said surfaces constituting jaw engaging threads, and a plurality of single bearing surfaces on said core, said jaws being disposed between said core and housing in mutually converging relation and inwardly urged at spaced points by the bearing surfaces on said housing, each of said jaws contacting a bearing surface on said core at a point opposite the space between the bearing surfaces on said housing, and means operative to provide lengthwise converging movement of said jaws including threads on said jaws engaging said threads on said housing, said threads being of a form suitable to constitute guiding as well as driving means for said jaws.

15. In a chuck construction a plurality of chuck jaws and means for supporting said jaws in operative relation to each other including members having spaced supporting portions acting on one side of each jaw, and a single supporting portion acting on the opposite side of said jaw substantially opposite the space between said spaced supporting portions, one of said members carrying means for advancing said jaws into engagement with a tool to be held by said chuck.

16. In a chuck construction a plurality of chuck jaws and means for supporting said jaws in operative relation to each other including members having spaced supporting portions acting on one side of each jaw, and a single supporting portion acting on the opposite side of said jaw substantially opposite the space between said spaced supporting portions, and one of said members carrying threads, said jaws having other threads engaged therewith for advancing said jaws into engagement with a tool to be held by said chuck.

17. In a chuck the combination of a core element, a plurality of jaws and a housing element, one of said elements having spaced bearing surfaces positioned to engage said jaws and the other element having a bearing surface positioned to engage a jaw opposite the space between said spaced bearing surfaces, means yieldably urging the housing bearings toward the core bearings and operative to prevent axial oscillatory movement of said jaws, shank engaging portions on said jaws, and means operative to move said jaws lengthwise to engage said portions with a shank to be held by said chuck.

18. In a chuck the combination of a core, a plurality of jaws and a housing, a plurality of spaced bearing surfaces in said housing, and a plurality of single bearing surfaces on said core, said jaws being disposed between said core and housing in mutually converging relation and inwardly urged at spaced points by the bearing surfaces on said housing, each of said jaws contacting a bearing surface on said core at a point opposite the space between the bearing surfaces on said housing, shank engaging surfaces on said jaws and means operative to provide lengthwise converging movement of said jaws.

JOHN LEONARD TAYLOR.